United States Patent [19]

Nelson et al.

[11] 3,751,273

[45] Aug. 7, 1973

[54] BURNED BASIC REFRACTORY AND BATCH THEREFOR

[75] Inventors: Michael A. Nelson, Jeffersonville, Ind.; Robert F. Patrick, Louisville, Ky.; Thomas M. Wehrenberg, Jeffersonville, Ind.

[73] Assignee: Corhart Refractories Company, Louisville, Ky.

[22] Filed: June 22, 1971

[21] Appl. No.: 155,624

[52] U.S. Cl. .................................. 106/57, 106/59
[51] Int. Cl. ...................... C04l 35/42, C04l 35/48
[58] Field of Search ................................ 106/59, 57

[56] References Cited
UNITED STATES PATENTS

| | | | |
|---|---|---|---|
| 3,210,206 | 10/1965 | Davies et al. | 106/59 |
| 3,309,209 | 3/1967 | Martinet et al. | 106/59 |
| 3,528,830 | 9/1970 | Davies | 106/59 |
| 3,535,134 | 10/1970 | Martinet et al. | 106/59 |

*Primary Examiner*—James E. Poer
*Attorney*—Clarence R. Patty, Jr. et al.

[57] ABSTRACT

Compacted and burned refractory body made from size-graded particulate batch mixture of chemical grade (Transvaal) chromite grain with low-silica content, periclase grain, fused grain of magnesia-chemical grade chromite and containing 40–58% MgO, and $ZrO_2$-yielding material. Chromite grain forms 10–35% of batch as −10+150 mesh particles, with less than 12% thereof being −100 mesh. The periclase grain and fused grain form three particle fractions: 25–60% of batch being coarse −4+20 mesh composed of (as percent of batch) 5–60% fused grain and 0–40% periclase grain, 0–30% of batch being intermediate −10+35 mesh, and 15–60% of batch being fine −35 mesh, of which periclase grain is at least 10% of batch. The total +28 mesh particles of chromite grain and periclase grain constitute 4% to less than 50% of batch. $ZrO_2$-yielding material is −65 mesh particles in amounts sufficient to provide 0.5–7% $ZrO_2$ based on whole batch. Body burned at 1,650° C. or higher characterized by modulus of rupture at 1,340° C. consistently above 1,750 psi and as high as 2,000 psi or higher.

13 Claims, No Drawings

BURNED BASIC REFRACTORY AND BATCH THEREFOR

BACKGROUND OF THE INVENTION

In a continuing search for better refractories to form linings and structures in furnaces employed for the modern methods of making steel and copper, and to withstand the harsher environments thereof, efforts have been directed to obtaining burned basic refractory that is ideally characterized by the combined attributes of the greatest direct bonding between the refractory cyrstal masses (i.e., minimal silicate or other lower melting phase as a bond between the refractory crystal masses) and highest high temperature strength together with the highest resistance to thermal shock or stress cracking as governed by lower modulus of elasticity. Early efforts in such direction utilized the elementary concept of firing the refractory to higher temperatures (e.g. 1,600°-1,700° C. or higher), but that technique was not fully satisfactory.

Some people in the refractories industry developed a particular interest in burned basic refractory formed of mixtures comprising periclase or magnesite and chromite. Further efforts to more closely approach the above-noted idealized characteristics involved such matters as particular size-grading of the particulate batch mixture, particular proportioning of the raw materials in that mixture and the addition to the mixture of certain other refractory material. The disclosures of U.S. Pat. No. 3,309,209 and U.K. Pat. Spec. No. 1,108,396 show that the then highest obtainable values of modulus or rupture at elevated temperatures of burned refractory formed of non-fused mixtures comprising magnesite and refractory greade chromite were obtained by, inter alia, the important proportioning of the relatively coarse particle size chromite to be at least about 49% and as much as 70% by weight of the whole refractory batch, and the important inclusion of $ZrO_2$-yielding material in an amount to provide about 0.2–5% $ZrO_2$ based on the whole refractory batch. That development was later substantially confirmed by the disclosure of U.S. Pat. No. 3,528,830 which (while failing to disclose any values of modulus of rupture at elevated temperatures approaching those shown in the two previously mentioned patents) shows that substantially lower values of modulus of rupture at 1,260° C. (2,300° F.) are obtained with the refractory grade chromite proportioned to be only about 40% by weight or less of the whole refractory batch. Even higher values of modulus of rupture at elevated temperatures have been obtained as shown by the disclosure of Canadian Pat. No. 844,011 wherein all of the refractory grade chromite was very importantly made part of the fine fraction by virtue of such chromite having particle sizing substantially entirely (e.g. 99.9%) passing 100 mesh, that chromite was proportioned to be only 15–25% by weight of the entire refractory batch, and the refractory batch includes about 0.25–0.75% $ZrO_2$ by weight. Thus, the combined teachings of this prior art is that, when seeking to obtain the benefit of $ZrO_2$-yielding material for improving direct bonding and high temperature strength, the discrete chromite fraction of the batch must be all fine −100 mesh particles when such chromite fraction is desired to be a minor portion of the batch and, in the alternative, the discrete chromite fraction must be at least about 49% by weight of the whole refractory batch when such chromite fraction is employed in the form of relatively coarse particle sizing (e.g., about −10+200 mesh).

Another approach to the above-noted idealized characteristics has been to include (instead of a $ZrO_2$-yielding material) 5% or more of fused grain (at least in a coarse fraction) composed essentially of a melted and resolidified mixture of chromite and magnesia. Such fused grain is mixed with dead-burned magnesite (or periclase) and unfused chromite, the latter constituent is ordinarily less than 40% of the batch and a substantial portion of that constituent is particles of relatively coarse sizes. In earlier developments of this type (see U.S. Pat. Nos. 3,210,206 and 3,262,797), refractory grade chromite was employed along with a special fused grain analyzing between 60–65% MgO. The resultant burned refractory exhibited a substantially improved modulus of rupture at 1,260° C. resulting from more extensive direct bonding and an improved thermal shock resistance. Even further improvement in high temperature strength characteristics (comparable to the best ones obtainable with the previously noted burned refractories with $ZrO_2$-yielding material) was more recently obtained (see our copending U.S. Pat. application Ser. No. 818,095 filed Apr. 21, 1969, now U.S. Pat. No. 3,589,919, and Ser. No. 120,722 filed Mar. 3, 1971) in burned refractories employing another special fused grain analyzing no more than 58% MgO and also employing chemical grade chromite as a discrete constituent amounting to only 10–50% of the refractory batch and in the form of −10+150 mesh particles.

Despite the technical advances above, there is still a continuing desire for further improvement in the noted characteristics (especially in the high temperature strength) of burned basic refractory because of strong economic pressures for lowering the cost of refractories per ton of metal produced and of further improvement in the operation of metal-producing furnaces that cause greater service hardship on the refractories.

SUMMARY OF THE INVENTION

We have now discovered a new burned basic refractory, and a batch from which to make it, that exhibits further improved hot strength in combination with excellent resistance to thermal shock and chemical attack by molten metal and slag and vapors or fumes thereof. Such refractory body, when burned at 1,600° C. or higher (advantageously at least 1,650° C.), is characterized by a modulus of rupture at 1,340° C. consistently above 1,750 psi and, in certain cases, of at least 2,000 psi or higher.

This new development has come about by our discovery that the addition of $ZrO_2$-yielding material to the refractory batches of our above-noted copending applications surprisingly coacts therewith to yield the improved hot strength despite the facts that the discrete chromite constituent therein is not more than 35% of the batch and is relatively coarse particle size material (contrary to the requirements noted in the prior art involving the inclusion of $ZrO_2$-yielding material).

Accordingly, the present invention is a size-graded particulate batch, and a compacted and burned refractory body composed essentially thereof, that consists essentially of 1. a mixture of chemical grade chromite grain containing less than 4% $SiO_2$, periclase or dead-burned magnesite grain, and fused grain composed essentially of a melted and resolidified mixture of chemical grade chromite and dead-burned magnesite or magnesia, which fused grain analyzes 40–58% (desirably 53–58%) MgO on an oxide basis, and $ZrO_2$-yielding material, 2. 10–35% (preferably at least 25%) being a chromite fraction whose particles are substantially all −10+150 mesh, with less than 12% thereof being −100 mesh, and composed of the chromite grain, 3. 25–60% (preferably 30–45%) being a coarse fraction whose particles are substantially all −4+20 mesh and composed of, with percentages based on whole batch, 5–60% the fused grain and 0–40% the periclase grain, 4. 0–30% (preferably 5–15%) being an intermediate fraction whose particles are substantially all −10+35 mesh and composed of the fused grain and/or the periclase grain, 5. 15–60% (preferably not more than 30%) being a fine fraction whose particles are −35 mesh and composed of, based on whole batch, 10–40% the periclase grain and 0–50% the fused grain, 6. 4 (preferably 15) to less than 50% being +28 mesh particles of the chromite grain and/or the periclase grain, and 7. $ZrO_2$-yielding material being −65 mesh particles and in amount sufficient to provide 0.5–7% (preferably 0.7–2.5%) $ZrO_2$ based on whole batch.

An amount of $ZrO_2$ in the burned refractory of less than 0.5% has been found to not enhance the high temperature strength and, on the contrary, to degrade such property in comparison what it would be in the absence of $ZrO_2$.

The more usual chemical grade chromite is Transvaal chromite, which is preferred. A typical range of analysis of such chromite is: 44.7–46.0% $Cr_2O_3$, 19.7–25.6% $FeO + Fe_2O_3$, 14.2–15.3% $Al_2O_3$, 10.0–11.4% MgO, 0.2–0.4% CaO and 0.7–3.8% $SiO_2$.

The periclase can be any of the ordinary, relatively high purity, available materials such as dead-burned or highly calcined magnesite or magnesia, or fused magnesia. ("Magnesite" and "magnesia" are used synonymously herein as is common in the industry.) A typical range of analysis of one suitable dead-burned magnesite, which we have employed, is: 94.0–96.5% MgO, 0.8–1.3% CaO, 1.3–2.4% $SiO_2$, 0.3–0.6% $Al_2O_3$, 0.3–0.8% FeO and trace of $Cr_2O_3$.

A typical range of analysis of one fused grain, obtained by crushing electrically melted, fusion-cast blocks, according to this invention is: 53.0–58.0% MgO, 17–22% $Cr_2O_3$, 5–10% $Al_2O_3$, up to 14% FeO, up to 3% $SiO_2$, up to 1% CaO, up to 1% fluorine, up to 2% $TiO_2$.

Any of the various commercially available $ZrO_2$-yielding materials can be used in the present invention. Such materials include zircon sand, various grades of zirconia containing $ZrO_2$ in amounts of at least about 85% up to about 99%, zirconium hydroxide, zirconium sulfate, zirconium tetrachloride, zirconium oxychloride, and zirconyl chloride. Any of these materials that are soluble in the tempering liquid employed (e.g., water, alcohol, etc.) can be added to the batch in the form of a solution made by dissolving the −65 mesh particles of such material in the tempering liquid. However, we prefer to employ a material that is not soluble in a tempering liquid, such as zircon sand and/or zirconia. While these materials ordinarily contain a small impurity content of $HfO_2$, the latter oxide is known to function substantially the same as $ZrO_2$ and, as is conventional practice in this art, the $HfO_2$ content is included within and not distinguished from the designated $ZrO_2$ content.

While the periclase grain of the coarse fraction can be generally of the same −4+20 mesh sizing as the fused grain of that same fraction, there has been observed in that case some tendency or such coarse periclase grains in the burned refractory to be prematurely "plucked out" in service during corrosion and erosion. As disclosed in our copending application, Ser. No. 120,722, filed Mar. 3, 1971, it is our further discovery that this problem can be suppressed by sizing the particles of coarse periclase grain substantially all −6+20 mesh. This results in a burned body with reduced void volume encircling the coarse periclase grain and increased amount of direct bonding to that grain.

In an especially beneficial form, the batch fractions are more particularly characterized as follows:

a. the chromite fraction is 0–45% +28 mesh particles and 60–95% +65 mesh particles, b. the fused grain of the coarse fraction is 73–89% +10 mesh particles, c. the periclase grain of the coarse fraction is 69–85% +10 mesh particles, d. the intermediate fraction is 70–86% +28 mesh particles, e. the fine fraction is 0–10% +65 mesh particles, 8–23% +150 mesh particles, and 27–43% +325 mesh particles, f. the $ZrO_2$-yielding material is at least about 90% −325 mesh particles.

In preparing a batch for fabricating bricks or other bodies, the appropriately size-graded and proportioned grain constituents for each fraction are mixed together for about 5–10 minutes, with tempering fluid, according to any suitable or conventional procedure. Preferably, solids except the fine fraction are first dry mixed for a minute or so. For pressing bricks, the tempering fluid can include lubricant and binder, such as a 10–33.3% water solution of waxy polyethylene glycol in an amount up to about 3% of the batch solids and/or a 50% water solution of lignin sulfite in an amount of about 0.25–3% of the batch solids. If the compacted green body is to be burned in service, the tempering fluid can be common aqueous sodium silicate solution with about 0.25–5% glycerin or ethylene glycol added as humectant to prevent drying cracks and a small amount of a common wetting agent that will reduce the amount of silicate required. The moldable batch is then formed by the usual techniques of mechanical pressing, hand ramming and like. For mechanical pressing of the more common furnace bricks ranging from 9 inches straight brick to 18 inches large brick, 400–800 tons press pressure is usual and adequate. After the green bodies are compacted to shape, they may be dried if desired to increase their green handling strength. Thereafter, they are burned at a temperature of at least 1,600° C. and as high as about 1,800° C. (but desirably 1,650°–1,725° C.) for at least about 6 hours, whereupon a very high degree of direct bonding and improved strength are effected in the burned products. They are also characterized by quite low apparent porosity (less than 20%) and good thermal shock resistance.

DESCRIPTION OF THE PREFERRED EMBODIMENTS

EXAMPLE 1. A variety of commercial size bricks are mechanically pressed from a tempered batch made from the following constituents:

Chromite Fraction
  Transvaal Chromite Grain —32%
Coarse Fraction
  Fused Grain —10%
  Dead-burned Magnesite —25%
Intermediate Fraction
  Fused Grain —5%
  Dead-Burned Magnesite —3%
Fine Fraction
  Fused Grain —5%
  Dead-Burned Magnesite —18%
$ZrO_2$-Yielding Material
  Milled Zircon Flour —2%

Each of these fractions of grain particles is size-graded so as to have the following cumulative percentages (maximum, minimum and typical) of the whole fraction left on each of the several mesh size screens:

(a) Chromite Fraction

| Mesh | Maximum | Minimum | Typical |
|---|---|---|---|
| 10 | 0 | 0 | 0 |
| 28 | 45 | 0 | 15 |
| 35 | 70 | 20 | 35 |
| 48 | 85 | 40 | 53 |
| 65 | 95 | 60 | 78 |
| 150 | 100 | 80 | 96 |

(b) Fused Grain of the Coarse Fraction

| Mesh | Maximum | Minimum | Typical |
|---|---|---|---|
| 4 | 0 | 0 | 0 |
| 6 | 21 | 1 | 10 |
| 8 | 57 | 39 | 48 |
| 10 | 89 | 73 | 78 |
| 12 | 100 | 85 | 92 |
| 20 | 100 | 94 | 97 |

(c) Magnesite of the Coarse Fraction

| Mesh | Maximum | Minimum | Typical |
|---|---|---|---|
| 6 | 0 | 0 | 0 |
| 8 | 40 | 24 | 32 |
| 10 | 85 | 69 | 77 |
| 12 | 97 | 87 | 92 |
| 20 | 100 | 95 | 97 |

(d) Intermediate Fraction

| Mesh | Maximum | Minimum | Typical |
|---|---|---|---|
| 10 | 0 | 0 | 0 |
| 14 | 21 | 3 | 9 |
| 20 | 61 | 43 | 52 |
| 28 | 86 | 70 | 78 |
| 35 | 100 | 85 | 92 |

(e) Fine Fraction

| Mesh | Maximum | Minimum | Typical |
|---|---|---|---|
| 35 | 0 | 0 | 0 |
| 65 | 10 | 0 | 5 |
| 100 | 15 | 0 | 8 |
| 150 | 23 | 8 | 15 |
| 200 | 30 | 15 | 22 |
| 250 | 33 | 18 | 26 |
| 325 | 43 | 27 | 35 |

(f) $ZrO_2$-Yielding Material

| Mesh | Maximum | Minimum | Typical |
|---|---|---|---|
| 325 | 100 | 90 | 99* |

*(average particle diameter: 20-25 microns)

Typical analyses of the four materials from which these constituents are formed are as follows:

Transvaal Chromite — 46.0% $Cr_2O_3$, 24.9% FeO + $Fe_2O_3$, 15.2% $Al_2O_3$, 11.3% MgO, 0.3% CaO, and 2.3% $SiO_2$;

Fused Grain — 55–56% MgO, 20% $Cr_2O_3$, 8% $Al_2O_3$, 11% FeO, 2.5% $SiO_2$, 0.5% CaO, 0.3% F, and 1.5% $TiO_2$;

Dead-Burned Magnesite — 95.8% MgO, 1.0% CaO, 1.8% $SiO_2$, 0.4% $Al_2O_3$, 0.6% $Fe_2O_3$, and 0.05% $Cr_2O_3$; and Milled Zircon Flour — 99.0% $ZrSiO_4$ (65.8% $ZrO_2$), 0.25% $SiO_2$ (free), 0.18% $TiO_2$, 0.25% $Al_2O_3$, 0.05% $Fe_2O_3$, and 0.01% $P_2O_5$.

After the pressed grain bricks are dried, they are burned at about 1,675° C. for at least 9 hours, whereupon extensive direct bonding was developed between the refractory crystals of periclase and chrome spinel. Typical property data for these bricks are set forth in Table I.

TABLE I

| Example No. | 1 | 2 | 3 |
|---|---|---|---|
| % $ZrO_2$ (calculated) | 1.3 | 3.3 | 6.6 |
| % Apparent Porosity | 15.5 | 17.4 | 18.8 |
| Bulk Density (lbs/ft.³) | 199.4 | 197.1 | 196 |
| Modulus of Rupture at 1340°C. (psi) | 2000 | 1750 | 1750 |

EXAMPLE 2 Commercial furnace size bricks are made using the same materials, proportions and size-grading thereof, and procedures as in the preceding example, except that the zircon flour is made 5% of the batch and the dead-burned magnesite of the fine fraction is made 15% of the batch. Typical property data of such bricks are set forth in Table 1.

EXAMPLE 3 Additional commercial furnace size bricks are made using the same material, proportioning and size-grading thereof, and procedures as in EXAMPLE 1, except that the zircon flour is made 10% of the batch and the dead-burned magnesite of the fine fraction is made 10% of the batch. Typical property data for such bricks is set forth in Table 1.

EXAMPLE 4. Further commercial furnace size bricks are made using the same materials, proportions, and size-grading thereof as in EXAMPLE 2, except that the zircon flour is replaced with a milled fused grade of zirconia having the following approximate analysis: 85% $ZrO_2$, 10% $Al_2O_3$, and 5% $SiO_2$. The grain bricks were fired to a maximum temperature in the range of 1,600°–1,665° C. The $ZrO_2$ content (calculated) is 4.25%. The typical apparent porosity is 15.4%, while a typical bulk density is 205.6 pounds/cubic foot. The typical modulus of rupture at 1,340° C. is 1,800 psi.

As noted previously, these batch formulations can also be employed as ramming mixes to form bodies that are burned in service.

In the foregoing specification, all mesh sizes are according to the Tyler series and all percentages are on a weight basis.

We claim:

1. A size-graded particulate batch for the production of refractory bodies consisting essentially of, with percentages on weight basis,
  a mixture of chemical grade chromite grain containing less than 4% $SiO_2$, periclase grain, fused grain composed essentially of a melted and resolidified mixture of chemical grade chromite and dead-burned magnesite, said fused grain analyzing 40 to 58% MgO on an oxide basis, and $ZrO_2$-yielding material, 10 to 35% being a chromite fraction whose particles are substantially all −10+150 mesh (Tyler), with less than 12% thereof being −100 mesh (Tyler), and composed of said chromite grain, 25 to 60% being a coarse fraction whose particles are substantially all −4+20 mesh (Tyler) and composed of, with percentages based on whole batch, 5 to 60% said fused grain and 0 to 40% said periclase grain, 0 to 30% being an intermediate fraction whose particles are substantially all −10+35 mesh (Tyler) and composed of at least one of said fused grain and said periclase grain, 15 to 60% being a fine fraction whose particles are −35 mesh (Tyler) and composed of, based on whole batch, 10 to 40% said periclase grain and 0 to 50% said fused grain, 4 to less than 50% being +28 mesh (Tyler) particles of at least one of said chromite grain and said periclase grain, and said $ZrO_2$-yielding material being −65 mesh (Tyler) particles and in amount sufficient to provide from 0.5 to 7% $ZrO_2$ based on whole batch.

2. The batch of claim 1 wherein said chemical grade chromite is Transvaal chromite, said periclase is dead-burned magnesite and said $ZrO_2$-yielding material is selected from zircon and zirconia.

3. The batch of claim 1 wherein the particles of said periclase grain of the coarse fraction are substantially all −6+20 mesh (Tyler).

4. The batch of claim 3 wherein
said chromite fraction is 0 to 45% +28 mesh (Tyler) particles and 60 to 95% +65 mesh (Tyler) particles,
said fused grain of the coarse fraction is 73 to 89% +10 mesh (Tyler) particles,
said periclase 10 of the coarse fraction is 69 to 85% +10 mesh (Tyler) particles,
said intermediate fraction is 70 to 86% +28 mesh (Tyler) particles,
said fine fraction is 0 to 10% +65 mesh (Tyler) particles, 8 to 23% +150 mesh (Tyler) particles and 27 to 43% +325 mesh (Tyler) particles, and
said $ZrO_2$-yielding material is at least about 90% −325 mesh (Tyler) particles.

6. The batch of claim 4 wherein said chromite fraction is at least 25% of said batch.

6. The batch of claim 4 wherein said +28 mesh (Tyler) particles constitute at least 15% of said batch.

7. The batch of claim 6 wherein
said chemical grade chromite is Transvaal chromite,
said periclase is dead-burned magnesite,
said $ZrO_2$-yielding material is selected from zircon and zirconia,
said chromite fraction is at least 25% of said batch,
said coarse fraction is 30 to 45% of said batch,
said intermediate fraction is 5 to 15% of said batch,
said fine fraction is not more than 30% of said batch, and
said $ZrO_2$-yielding material is in amount sufficient to provide 0.7 to 2.5% $ZrO_2$ based on whole batch.

8. A compacted and burned refractory body composed essentially of the batch of claim 1.

9. The body of claim 8 which has been burned at a temperature of at least 1,600° C.

10. A compacted and burned refractory body composed essentially of the batch of claim 4.

11. The body of claim 10 which has been burned at a temperature of at least 1,650° C.

12. A compacted and burned refractory body composed essentially of the batch of claim 7.

13. The body of claim 12 which has been burned at a temperature of at least 1,675° C.

* * * * *